United States Patent
Roberts

(10) Patent No.: US 7,983,214 B2
(45) Date of Patent: Jul. 19, 2011

(54) CONFIGURATION METHOD OF RADIO RESOURCE IN MOBILE COMMUNICATION NETWORK

(75) Inventor: Michael Roberts, Neuilly sur Seine (FR)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 12/064,735

(22) PCT Filed: Nov. 8, 2006

(86) PCT No.: PCT/JP2006/322233
§ 371 (c)(1),
(2), (4) Date: Apr. 14, 2008

(87) PCT Pub. No.: WO2007/055221
PCT Pub. Date: May 18, 2007

(65) Prior Publication Data
US 2009/0268673 A1    Oct. 29, 2009

(30) Foreign Application Priority Data
Nov. 8, 2005    (FR) ...................................... 05 53378

(51) Int. Cl.
*H04W 4/00* (2009.01)
*H04L 12/26* (2006.01)
*H04J 3/16* (2006.01)

(52) U.S. Cl. .................... 370/329; 370/252; 370/465

(58) Field of Classification Search .................. 370/252, 370/329, 464–465
See application file for complete search history.

(56) References Cited

U.S. PATENT DOCUMENTS

| 7,177,658 B2* | 2/2007 | Willenegger et al. ......... 455/522 |
| 2003/0131124 A1* | 7/2003 | Yi et al. ....................... 709/236 |
| 2005/0075124 A1 | 4/2005 | Willenegger et al. |
| 2009/0068952 A1* | 3/2009 | Roberts ......................... 455/63.1 |
| 2009/0245123 A1* | 10/2009 | Blanc et al. ................... 370/252 |

FOREIGN PATENT DOCUMENTS

| FR | 2866188 A1 | 8/2005 |
| JP | 2006108960 A | 4/2006 |
| JP | 2006516870 A | 7/2006 |
| WO | 2004032552 A1 | 4/2004 |
| WO | 2005078959 A1 | 8/2005 |

OTHER PUBLICATIONS

International Search Report for PCT/JP2006/322233, mailed Feb. 20, 2007.
Supplementary European Seach Report for EP Application No. 06823137 completed Oct. 7, 2008.
"3rd Generation Partnership Project; Technical Specification Group Radio Access Network; Radio Resource Control (RRC); Protocol Specification (Release 6), 3GPP TS25.331 V6.7.0", Sep. 2005, pp. 39-92 and 368-501.

* cited by examiner

*Primary Examiner* — Warner Wong

(57) ABSTRACT

The present invention is to enable a network to control an exemplary aspect of a terminal so as to adapt distribution of resources between a plurality of users. A method of a radio resource in a mobile communication network, including steps of: determining a ratio of terminals that desire reception of MBMS service; transmitting a signal for requesting terminals to indicate that these terminals do not support HSDPA service but support DCH service to a network in the case that the determined ratio is not more than a predetermined threshold value; and allocating a resource, which is necessary for effective simultaneous reception of MBMS service, a packet switch service (PS), and a circuit switch service (CS), to terminals.

11 Claims, 4 Drawing Sheets

F I G. 10
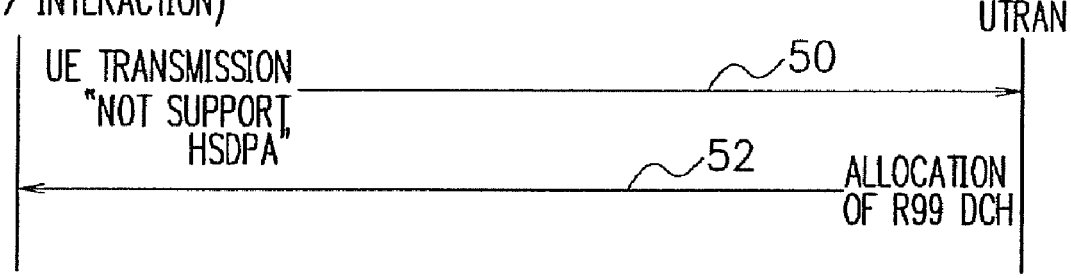

CONFIGURATION METHOD OF RADIO RESOURCE IN MOBILE COMMUNICATION NETWORK

TECHNICAL FIELD

The present invention relates to a field of remote communications, and particularly, relates to a configuration method of a radio resource in a mobile communication network.

The present invention also relates to a mobile terminal for simultaneously receiving MBMS service and DCH service.

BACKGROUND ART

In UMTS, a radio interface between a terminal and UTRAN (Universal Terrestrial Radio access Network) includes the following three main protocol layers.
 physical layer (layer 1)
 link layer (layer 2)
 Radio Resource Control (RRC) layer The RRC layer plays a role to manage a signal between the UTRAN and a mobile object and a configuration of a resource for protocol layers 1 and 2 in a radio interface. The RRC layer provides a signal message to non-connection layers.

The UTRAN has large flexibility in management of a radio resource. This appears as various services depending on an activity level of a related mobile object in RRC protocol area. A main principal is to adapt allocation of the radio resource to the mobile object in any time in accordance with demand of traffic.

The RRC protocol has two modes, namely, an Idle mode, in which a voltage is applied to the mobile object but there is no RRC connection between the mobile object and the UTRAN, and a connection mode, in which the mobile object is RRC-connected to the UTRAN. The connection mode is mainly classified into four states, namely, CELL_DCH, CELL_FACH, CELL_PCH, and URA_PCH.

The CELL_DCH state is characterized by an allocation of a dedicated radio resource (one or more transmission channels of DCH (Dedicated Channel) type) to the mobile object. The dedicated resource is allocated for traffic of a real time type or for transmission of high-capacity data.

In the CELL-FACH state, no dedicated radio resource is allocated to the mobile object. In this state, common transmission channels (RACH: Random access channel, FACH: Forward access channel, and CPCH: Common Packet channel) are used for transmission between the terminal and the network. The CELL_DCH state is suitable for transmission of low-capacity data without restriction of a real time.

The CELL_PCH and the URA_PCH states are dormant state of the RRC protocol in a connection mode. Transition to the dormant state is controlled by the network after it has been found that lack of user traffic is prolonged, for example. In the dormant state, the mobile object is in a discontinuous receiving mode (a DRX for a discontinuous receiving) and its main activity is to monitor a paging channel and to manage mobility of the mobile object in the UTRAN. The RRC needs to return to the CELL_FACH state and carry out position determination update procedure in the UTRAN before restarting the user traffic.

Accordingly, in the CELL_PCH or the URA_PCH state, if the user traffic in a downward direction is indicated to the UTRAN, the UTRAN commands the mobile object to transit to the CELL_FACH state for restarting the traffic by sending a paging message to the mobile object. Then, the mobile object transits to the CELL_FACH state and carries out position determination update procedure (Cell Update) due to a response to the paging. After that, the user traffic can be restarted.

In the case of the traffic in an upward direction, the RRC layer of the mobile object transits to the CELL_FACH state and starts the Cell Update procedure due to the traffic restart on a route in the upward direction. Then, if this procedure is well achieved, the traffic will be restarted.

A specification of RAN WG group (release 5) of 3GPP (third Generation Partner Group) defines HSDPA (High Speed Downlink Packet Access) technology, which enables high-speed data transmission from a network to a terminal by allocating a resource of each channel to various users 500 times per second. The operation is carried out during a time slot between two packets in accordance with modulation and a bit rate determined by adaptation of a radio link.

In CDMA channel, it is referred again that all users use the same frequency band and each user is identified by one code. In the UMTS, a single code is allocated to each mobile object and this means that a resource of the channel is used by a single user. On the other hand, according to HSDPA technology, up to 14 codes can be allocated to each mobile object, so that all resources of one channel may be shared allowing dynamical allocation according to a demand of each mobile object at a certain transmission bit rate. This transmission bit rate may reach to 8 to 10 Mbps at a frequency band of 5 MHz in WCDMA down link. Such increase of a bit rate is derived from the fact that unlikely to the UMTS transmitting 2 bits information per "symbol" (or baud) using a QPSK modulation, the HSDPA further implements a 16QAM modulation for sending 4 bits per symbol. Further, in the UMTS, 10 to 20 milli-seconds elapse between transmission of two packets, however, in the HSDPA, the interval is shortened to 2 milli-seconds. Therefore, the traffic is accelerated. In addition, in the WCDMA, a base station is operated with transmission power for maintaining a certain quality, and according to the HSDPA technology, the base station adapts speed to transmission condition constantly. Further, the HSDPA technology introduces a new packet ACK mechanism. Generally, if a wrong packet arrives, a receiver eliminates it and requests retransmission of a correct packet. Although the HSDPA also requests retransmission, the HSDPA memorizes this. This is based on a principal such that, in the case that a wrong packet arrives, it is feared that the following packets are also wrong. The purpose thereof is to reproduce a correct packet from a plurality of wrong packet fragments.

Further, a specification of 3GPP (release 6) group integrates MBMS service (Multi-Broadcast/Multicast Service) into a 3G standard in order to provide broadcast of the same content to a plurality of destinations. At first, a configuration, in which a terminal is capable of receiving the broadcasted MBMS service, only when the terminal is in the condition of IDLE, CELL_PCH, URA_PCH, and CELL_FACH, is considered. After that, a configuration, in which a terminal is capable of receiving these services when the HSDPA receive channel is not used in the CELL_DCH state simultaneously, namely, when a receive channel R99 DCH is only used, is considered.

Due to introduction of the new HSDPA technology, the 3GPP group comes to define a new resource such as a new control channel (F-DPCCH) or the like, a new signal carrier wave and a voice transmission in the HSDPA channel. This means that the HSDPA receive channel is likely to be automatically allocated to the terminal in the CELL_DCH state. Here, an MBMS packet is more likely to be lost when the HSDPA receive channel is allocated. Therefore, the terminal may need to receive the MBMS packet at the second time or to carry out a correction using a point-to-point mechanism and thereby, battery life of the terminal is remarkably shortened.

As a result, if the HSDPA channel is allocated to the terminal, the terminal cannot effectively receive the MBMS service, a packet switch service (PS), and a (voice) circuit switch service (CS) at the same time. On the other hand, it has been more and more desired that the terminal can receive the service even when the terminal is in the CELL_DCH state.

DISCLOSURE OF THE INVENTION

However, the specification of the 3GPP group does not specify the procedure that a network prevents the HSPDA channel from being allocated when the mobile object desires the simultaneous reception of the MBMS service.

An exemplary object of the present invention is to enable a network to control an exemplary aspect of a terminal so as to adapt distribution of resources between a plurality of users.

Particularly, an exemplary object of the present invention is to form a signal causing the UTRAN not to allocate HSDPA channel to a terminal when the terminal needs to provide PS service and CS service at the same time to receive the MBMS service.

The exemplary object is achieved by a configuration method of a radio resource in a mobile communication network, the method including steps of: determining a ratio of terminals that desire reception of MBMS service; transmitting a signal for requesting terminals to indicate that these terminals do not support HSDPA service but support DCH service to a network in the case that the determined ratio is not more than a predetermined threshold value; and allocating a resource, which is necessary for an effective simultaneous reception of MBMS service, a packet switch service (PS), and a circuit switch service (CS), to terminals.

According to a second exemplary aspect of the present invention, the present method includes steps of: transmitting a signal for requesting terminals that do not implement real-time connection to indicate that these terminals do not support HSDPA service but support DCH service to a network; and allocating a resource, which is necessary for effective simultaneous reception of MBMS service, a packet switch service (PS), and a circuit switch service (CS), to terminals.

BEST MODE FOR CARRYING OUT THE INVENTION

With reference to FIG. 1, the first exemplary embodiment of the present method includes counting of a number of terminals capable of receiving the MBMS service. Therefore, the UTRAN (Universal Terrestrial Radio access Network) may transmit a signal for performing a count procedure to terminals located in the network (arrow 2). When the counted number of the terminals is small, the UTRAN may transmit a command to allow correction of a receiving capacity of the MBMS service (arrow 4).

For the purpose, a terminal desiring reception of the MBMS service may transmit a message, which indicates that the HSDPA service is not supported any more and a packet switch service and a circuit switch service transmitted via the R99DCH channel are supported, to the network.

During such signal exchange, an exemplary aspect of each terminal may depend on a state, in which the terminal is on reception of a command from the UTRAN.

FIG. 2 illustrates a case that a terminal, which indicates that it does not support the HSDPA service but supports the DCH service to the network, is in connection with the RRC and is receiving a paging message for PS service from the network.

Receiving the paging message (arrow 6), these terminals may transmit a signal, which indicates that the HSDPA service is not supported any more and is in a waiting state for the MBMS service, to the network (arrow 8).

The network may allocate R99DCH resource, which is necessary for effective simultaneous reception of the MBMS service, the packet switch service (PS), and the circuit switch service (CS), to the terminal (arrow 10).

FIG. 3 illustrates a case that a terminal indicating that it does not support the HSDPA service but supports the DCH service to the network is in connection with the RRC and desires transmission of the packet service (PS).

These terminals may transmit a cell update signal to the network according to Cell Update procedure to indicate changes of the terminal positions in a couverture cellulaire to the network (arrow 12). Then, these terminals indicate that the HSDPA is not supported any more. Receiving the message, the network may allocate the R99DCH resource, which is necessary for effective simultaneous reception of the MBMS service, the packet switch service (PS), and the circuit switch service (CS), to the terminal (arrow 14).

FIG. 4 illustrates a case that a terminal indicating that it does not support the HSDPA service but supports the DCH service to the network is in a dormant state and is receiving a paging message for the PS service from the network.

Receiving the message (arrow 16), these terminals may transmit a signal indicating that the HSDPA service is not supported any more and these terminals are in a waiting state for the MBMS service to the network (arrow 18).

Next, the network may allocate the R99DCH resource, which is necessary for effective simultaneous reception of the MBMS service, the packet switch service (PS), and the circuit switch service (CS), to the terminal (arrow 20).

FIG. 5 illustrates a case that a terminal indicating that it does not support the HSDPA service but supports the DCH service to the network is in a dormant state and desires transmission of the packet service (PS). These terminals may transmit a signal indicating that the HSDPA service is not supported any more and these terminals are in a waiting state for the MBMS service to the network (arrow 22).

Next, the network may allocate the R99DCH resource, which is necessary for effective simultaneous reception of the MBMS service, the packet switch service (PS), and the circuit switch service (CS), to the terminal (arrow 24).

FIG. 6 shows a second exemplary embodiment of the method according to the present invention such that UTRAN network transmits a signal, for requesting to indicate that the HSDPA service is not supported but the DCH service is supported, to the terminal that does not perform real time connection.

For the purpose, the UTRAN (Universal Terrestrial Radio Access Network) may transmit a signal for performing a count procedure to the terminal in the network (arrow 30).

In the case that the number of counted terminals is large, the UTRAN may show an acceptance ratio of terminals capable of effectively receiving the MBMS service, the packet switch service (PS), and the circuit switch service (CS) at the same time and may transmit a command to allow correction of a receiving capacity of the MBMS service to the counted predetermined terminals (arrow 32).

During such signal exchange, an exemplary aspect of each terminal may depend on a state, in which the terminal is on reception of a command from the UTRAN.

FIG. 7 illustrates a case that a terminal indicating that it does not support the HSDPA service but supports the DCH service to the network is in connection with the RRC and is receiving a paging message for the PS service from the network.

In this case, the network may transmit a message for prompting to adapt a capacity only to terminals that do not perform the real-time connection (arrow 34).

Receiving the message, these terminals may transmit a signal indicating that the HSDPA service is not supported any more and is in a waiting state for the MBMS service to the network (arrow 36).

Next, the network may allocate the R99DCH resource, which is necessary for effective simultaneous reception of the MBMS service, the packet switch service (PS), and the circuit switch service (CS), to the terminal (arrow 38).

FIG. 8 illustrates a case that a terminal indicating that it does not support the HSDPA service but supports the DCH service to the network is in connection with the RRC and desires a packet transmission service although not in real time (at a background mode or a low bit rate mode).

These terminals may transmit a signal indicating that the HSDPA service is not supported any more and the terminal is in a waiting state for the MBMS service to the network (arrow 40).

Next, the network may allocate the R99DCH resource, which is necessary for effective simultaneous reception of the MBMS service, the packet switch service (PS), and the circuit switch service (CS), to the terminal (arrow 42).

FIG. 9 illustrates a case that a terminal indicating that it does not support the HSDPA service but supports the DCH service to the network is in a dormant state and is receiving a paging message for the PS service from the network.

In this case, the network may transmit a message for prompting to adapt a capacity only to terminals that do not perform the real-time connection (arrow 44).

Receiving the message, these terminals may transmit a signal indicating that the HSDPA service is not supported any more and is in A waiting state for the MBMS service to the network (arrow 46).

Next, the network may allocate the R99DCH resource, which is necessary for effective simultaneous reception of the MBMS service, the packet switch service (PS), and the circuit switch service (CS), to the terminal (arrow 48).

FIG. 10 illustrates a case that a terminal indicating that it does not support the HSDPA service but supports the DCH service to the network is in a dormant state and desires transmission of the packet service (PS) although not in real time (at a background mode or a low bit rate mode).

In this case, the terminal may transmit a signal indicating that the HSDPA service is not supported any more and is in a waiting state for the MBMS service to the network (arrow 50).

The network may allocate the R99DCH resource, which is necessary for an effective simultaneous reception of the MBMS service, the packet switch service (PS), and the circuit switch service (CS), to the terminal (arrow 52).

BRIEF DESCRIPTION OF THE DRAWINGS

FIG. 10 is a schematic view showing various exemplary aspects of the mobile terminal according to the second exemplary embodiment.

Figure 1:
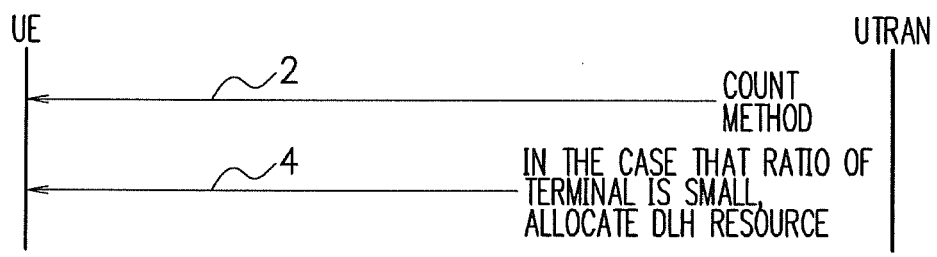
FIG. 1 is a schematic view showing a first exemplary embodiment of a method according to the present invention.
Figure 2:
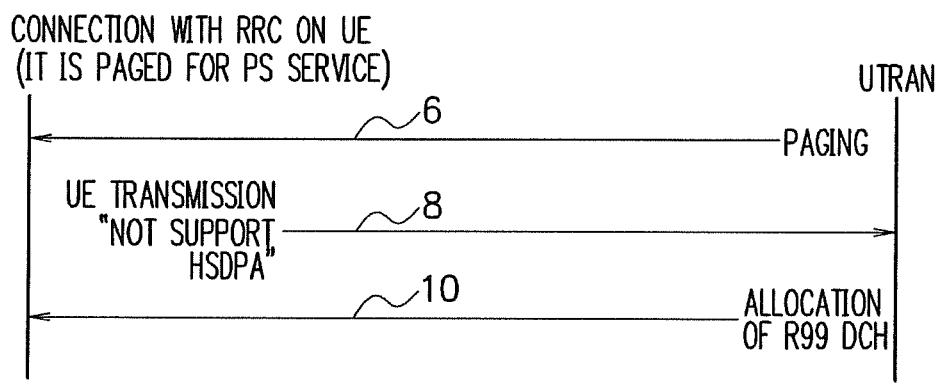
FIG. 2 is a schematic view showing various exemplary aspects of a mobile terminal according to the first exemplary embodiment.
Figure 3:
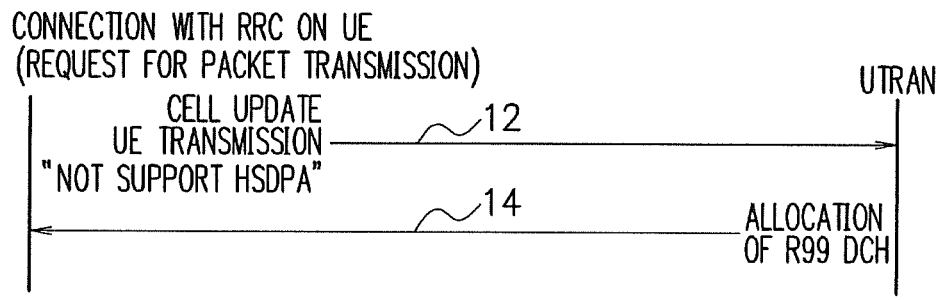
FIG. 3 is a schematic view showing various exemplary aspects of the mobile terminal according to the first exemplary embodiment.
Figure 4:
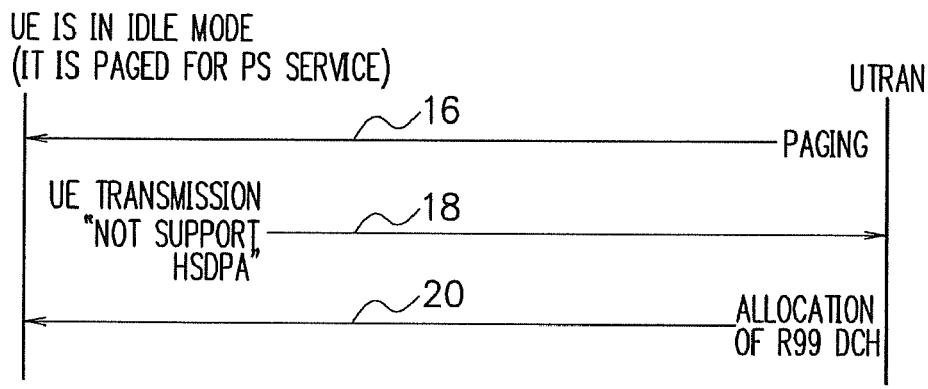
FIG. 4 is a schematic view showing various exemplary aspects of the mobile terminal according to the first exemplary embodiment.
Figure 5:
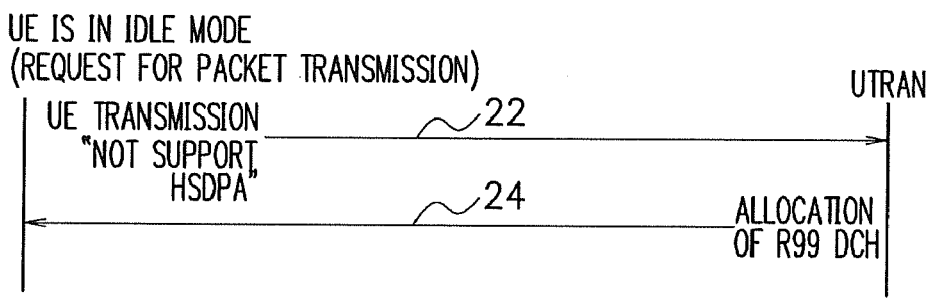
FIG. 5 is a schematic view showing various exemplary aspects of the mobile terminal according to the first exemplary embodiment.
Figure 6:
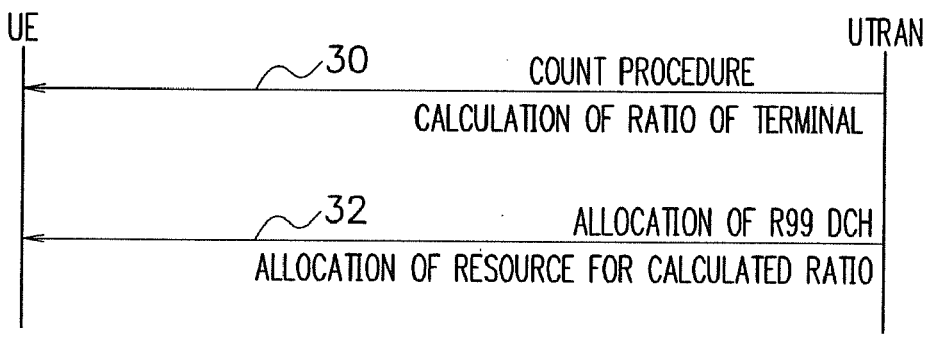
FIG. 6 is a schematic view showing a second exemplary embodiment of a method according to the present invention.
Figure 7:
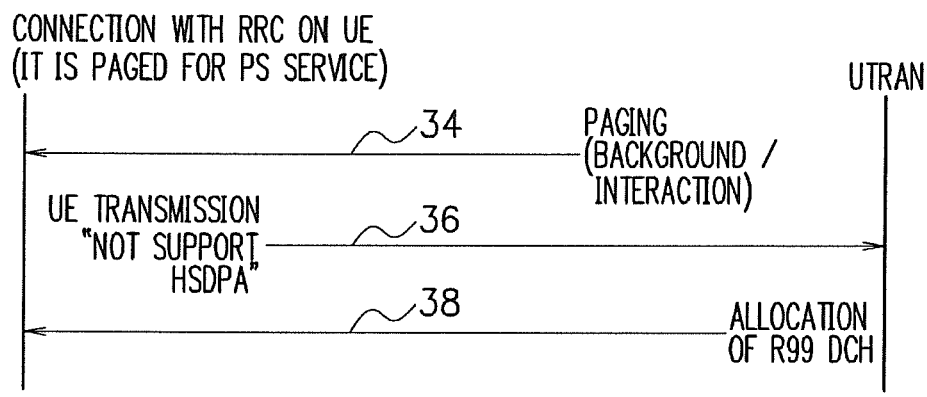
FIG. 7 is a schematic view showing various exemplary aspects of a mobile terminal according to the second exemplary embodiment.
Figure 8:
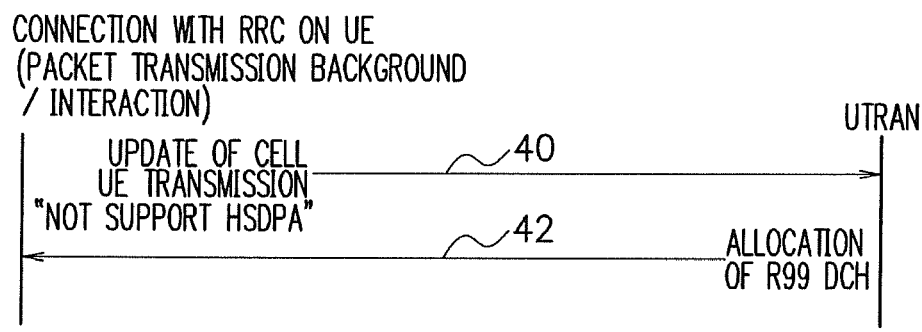
FIG. 8 is a schematic view showing various exemplary aspects of the mobile terminal according to the second exemplary embodiment.
Figure 9:
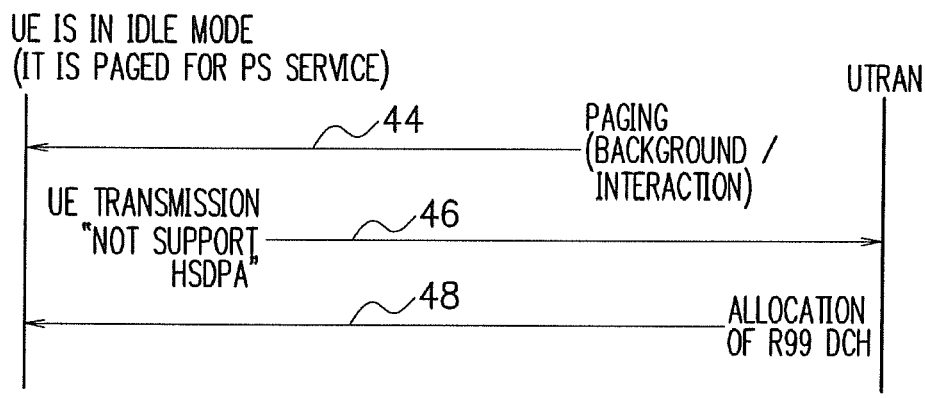
FIG. 9 is a schematic view showing various exemplary aspects of the mobile terminal according to the second exemplary embodiment.

The invention claimed is:

1. A configuration method of a radio resource in a mobile communication network, comprising steps of:
    determining a ratio of terminals that desire reception of MBMS service;
    transmitting a signal for requesting terminals to indicate that these terminals do not support HSDPA service but support DCH service to a network in the case that the determined ratio is not more than a predetermined threshold value; and
    allocating a resource, which is necessary for effective simultaneous reception of MBMS service, a packet switch service (PS), and a circuit switch service (CS), to terminals.

2. The method according to claim 1, wherein the network controls a ratio of terminals that desire reception of the MBMS service.

3. The method according to claim 1, wherein a terminal indicating that it does not support the HSDPA service but supports the DCH service to the network is a terminal that is in connection with RRC and receives a paging message for PS service from the network.

4. The method according to claim 1, wherein a terminal indicating that it does not support the HSDPA service but supports the DCH service to the network is a terminal that is in connection with RRC and desires transmission of packet service (PS).

5. The method according to claim 1, wherein a terminal indicating that it does not support the HSDPA service but supports the DCH service to the network is a terminal that is in a dormant state and receives a paging message for a PS service from the network.

6. The method according to claim 1, wherein a terminal indicating that it does not support the HSDPA service but supports the DCH service to the network is a terminal that is in a dormant state and desires transmission of packet service (PS).

7. A configuration method of radio resource in a mobile communication network, comprising steps of:
    transmitting a signal for requesting terminals that do not implement real-time connection to indicate that these terminals do not support HSDPA service but support DCH service to a network; and allocating a resource, which is necessary for effective simultaneous reception of MBMS service, a packet switch service (PS), and a circuit switch service (CS), to terminals.

8. The method according to claim 7,
wherein a terminal indicating that it does not support the HSDPA service but supports the DCH service to the network is a terminal that is in connection with RRC and receives a paging message for a PS service from the network.

9. The method according to claim 7,
wherein a terminal indicating that it does not support the HSDPA service but supports the DCH service to the network is a terminal that is in connection with RRC and desires transmission of a packet service (PS).

10. The method according to claim 7,
wherein a terminal indicating that it does not support the HSDPA service but supports DCH service to the network is a terminal that is in a dormant state and receives a paging message for a PS service from the network.

11. The method according to claim 7,
wherein a terminal indicating that it does not support the HSDPA service but supports the DCH service to the network is a terminal that is in a dormant state and desires transmission of a packet service (PS).

* * * * *